United States Patent [19]
Breese

[11] Patent Number: 5,566,721
[45] Date of Patent: Oct. 22, 1996

[54] DRIVESHAFT TUBE HAVING SOUND DEADENING COATING

[75] Inventor: Douglas E. Breese, Northwood, Ohio

[73] Assignee: Dana Corporation, Toledo, Ohio

[21] Appl. No.: 504,323

[22] Filed: Jul. 20, 1995

[51] Int. Cl.$^6$ ........................................................ F16L 9/14
[52] U.S. Cl. ........................... 138/145; 138/143; 181/207
[58] Field of Search .................................. 138/143, 145, 138/146, 149; 181/207, 211

[56] References Cited

U.S. PATENT DOCUMENTS

| | | |
|---|---|---|
| 3,153,397 | 10/1964 | Mattson et al. . |
| 3,170,435 | 2/1965 | Najimian, Jr. . |
| 3,420,277 | 1/1969 | Ceintrey ................................. 138/143 |
| 3,425,455 | 2/1969 | Kilpert et al. . |
| 3,494,813 | 2/1970 | Lawrence et al. ..................... 138/146 |
| 3,557,902 | 1/1971 | Brown et al. . |
| 3,586,122 | 6/1971 | Jacke . |
| 3,845,839 | 11/1974 | Eriksson . |
| 4,071,048 | 1/1978 | Watase ................................... 138/143 |
| 4,190,131 | 2/1980 | Robinson ............................... 138/149 |
| 4,223,565 | 9/1980 | Sugiyama et al. ....................... 74/574 |
| 4,258,821 | 3/1981 | Wendt et al. . |
| 4,273,207 | 6/1981 | Sivers et al. ............................ 138/149 |
| 4,341,842 | 7/1982 | Lampe . |
| 4,367,259 | 1/1982 | Fulmer et al. ......................... 428/240 |
| 4,750,860 | 6/1988 | Kelley . |
| 4,828,910 | 5/1989 | Haussling ............................... 428/284 |
| 4,844,193 | 7/1989 | Veselica et al. . |
| 4,878,523 | 11/1989 | Balsamico et al. . |
| 4,930,678 | 6/1990 | Cyb . |
| 5,125,289 | 6/1992 | Heidrich . |
| 5,422,380 | 6/1995 | Mendelsohn .......................... 521/107 |

*Primary Examiner*—David Scherbel
*Assistant Examiner*—James F. Hook
*Attorney, Agent, or Firm*—MacMillan, Sobanski & Todd

[57] ABSTRACT

The invention relates to a driveshaft tube having improved sound deadening properties. This benefit is achieved by coating the inner cylindrical surface of the driveshaft tube with a sound deadening material. Preferably the coating material has a density of at least about 0.8 g/cc. A preferred coating material is a urethane elastomer. A coating between 0.010 inch (0.025 cm) and 0.125 inch (0.308 cm) thick is preferred. In the method for forming the driveshaft tube, preferably the coating material is applied as a liquid and allowed to harden. A preferred application method involves spray coating the inner cylindrical surface of the driveshaft tube. The end portions of the driveshaft tube are left uncoated to avoid the end yoke welds.

12 Claims, 2 Drawing Sheets

DRIVESHAFT TUBE HAVING SOUND DEADENING COATING

BACKGROUND OF THE INVENTION

This invention relates in general to vehicle driveshafts, and in particular to a vehicle driveshaft tube having improved sound deadening properties.

Torque transmitting shafts are widely used for transferring rotational power between a source of rotational power and a rotatably driven mechanism. An example of a torque transmitting shaft is a driveshaft tube used in a vehicle driveshaft assembly. The driveshaft assembly transmits rotational power from a source, such as an engine, to a driven component, such as a pair of wheels.

A typical vehicle driveshaft assembly includes a hollow cylindrical driveshaft tube having an end fitting secured to each end thereof. Usually, the end fittings are embodied as end yokes which are adapted to cooperate with respective universal joints. For example, a driveshaft assembly of this general type is often used to provide a rotatable driving connection between the output shaft of a vehicle transmission and an input shaft of an axle assembly for rotatably driving the vehicle wheels.

One problem encountered by driveshaft tubes is their tendency to produce and transmit sound while transferring the power of the engine to the axle assembly. The sound can be undesirably noisy to passengers riding in the vehicle. Thus it would be advantageous to deaden or reduce the sound produced by a vehicle driveshaft tube, in order to provide the passengers with a more quiet and comfortable ride.

Various attempts have been made to deaden the sound produced by vehicle driveshaft tubes. In one such attempt, a hollow cylindrical cardboard insert was disposed inside an aluminum driveshaft tube to deaden the sound. However, the cardboard insert required external rubber ribs to prevent it from sliding inside the aluminum driveshaft tube, and as a result it was relatively complicated and expensive to employ. Other attempts at deadening the sound produced by driveshaft tubes have suffered from similar drawbacks and have not been totally satisfactory.

A solution to the sound problem is not straightforward. For instance, there are questions concerning what types of materials could be employed, and how the materials could be used with the driveshaft tube to deaden sound. The effects of different approaches on sound production are uncertain. Further, any solution to the sound problem would have to take into consideration the structure of the driveshaft tube having end yokes welded at the ends.

Thus, it would be desirable to provide a driveshaft tube that produces and transmits less sound during operation of the vehicle. It would particularly be desirable to provide an uncomplicated, inexpensive and effective method to deaden the sound of such a driveshaft tube.

SUMMARY OF THE INVENTION

The invention relates to a driveshaft tube having improved sound deadening properties. This benefit is achieved by coating the inner cylindrical surface of the driveshaft tube with a sound deadening material. Preferably the coating material has a density of at least about 0.8 g/cc. A preferred coating material is a urethane elastomer. A coating between 0.010 inch (0.025 cm) and 0.125 inch (0.308 cm) thick is preferred. In the method for forming the driveshaft tube, preferably the coating material is applied as a liquid and allowed to harden. A preferred application method involves spray coating the inner cylindrical surface of the driveshaft tube. The end portions of the driveshaft tube are left uncoated to avoid the end yoke welds.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
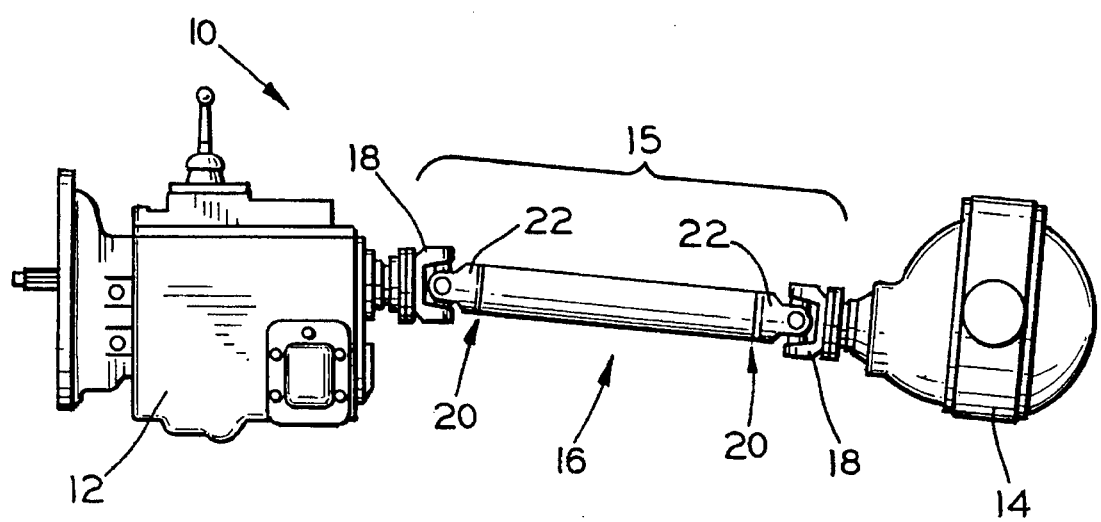
FIG. 1 is a schematic view in elevation of a vehicle drive train including a driveshaft tube.

Referring now to the drawings, there is illustrated in FIG. 1 a vehicle drive train, indicated generally at 10. The drive train is comprised of transmission 12 connected to axle assembly 14 through drive line assembly 15. The drive line assembly includes a cylindrically shaped driveshaft tube 16. As is typical in vehicle drive trains, the transmission output shaft, not shown, and the axle assembly input shaft, not shown, are not coaxially aligned. Therefore, universal joints 18 are positioned at each end 20 of the driveshaft tube 16 to rotatably connect the driveshaft tube to the transmission output and the axle assembly input. The connection between the ends 20 of the driveshaft tube and the universal joints is accomplished by tube yokes 22.

Figure 2:
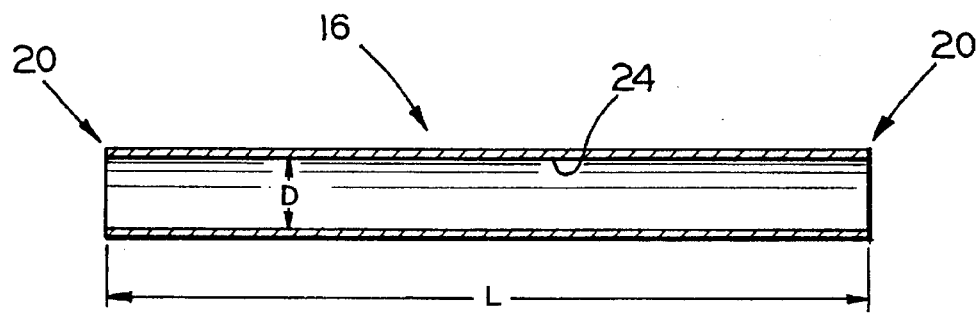
FIG. 2 is a side cross-sectional view of a conventional, uncoated driveshaft tube.

FIG. 2 shows a side cross-sectional view of a conventional, uncoated driveshaft tube 16. It can be seen that the driveshaft tube 16 is a hollow cylindrical tube having a relatively long, narrow shape. The driveshaft tube 16 has an axial length L defined by the distance between the two ends 20. The ends 20 of the driveshaft tube 16 are open. The driveshaft tube 16 includes an inner cylindrical surface 24 which extends the length of the tube and which defines an internal diameter D. As shown in FIG. 2, the driveshaft tube 16 can be formed from a single piece of metal, or multiple piece driveshaft tubes can also be used. The driveshaft tube 16 can be formed from any suitable material, and preferably it is formed from steel or an aluminum alloy. Suitable methods for forming the driveshaft tube 16 are well known to persons skilled in the art.

Figure 3:
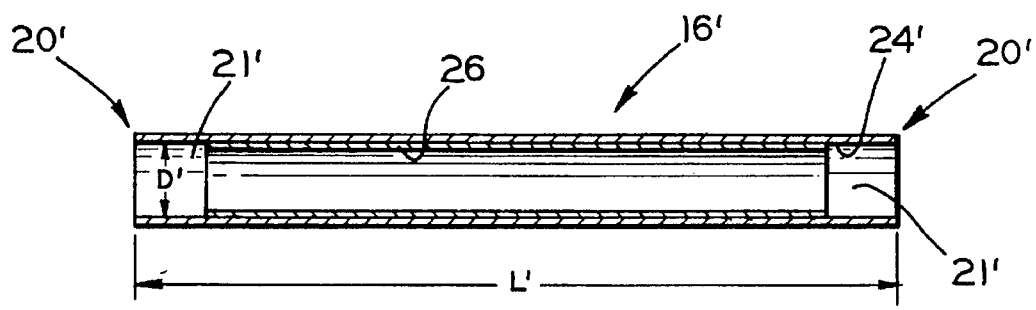
FIG. 3 is a side cross-sectional view of a coated driveshaft tube in accordance with this invention, having an internal coating of sound deadening material.

Referring now to FIG. 3, there is illustrated a driveshaft tube 16' in accordance with this invention. Again, it can be seen that the driveshaft tube 16' is a hollow cylindrical tube having a relatively long, narrow shape. The driveshaft tube 16' has an axial length L' defined by the distance between the two ends 20'. The ends 20' of the driveshaft tube 16' are open. The drive, shaft tube 16' includes end portions 21'. The driveshaft tube 16' includes an inner cylindrical surface 24' which extends the length L' of the tube and which defines an internal diameter D'. As shown in FIG. 3, the driveshaft tube 16' can be formed from a single piece of metal, or multiple piece driveshaft tubes can also be used. The driveshaft tube 16' can be formed from any suitable material, and preferably it is formed from steel or an aluminum alloy. Suitable methods for forming the driveshaft tube 16' are well known to persons skilled in the art.

The driveshaft tube 16' in accordance with this invention has improved sound deadening properties to reduce noise and vibration from the driveshaft tube during operation of the vehicle. The invention achieves this benefit by coating the inner cylindrical surface 24' of the driveshaft tube 16' with an effective sound deadening coating material 26. The coating material 26 is applied in an effective manner. Preferably the coating material 26 is applied between about 0.010 inch (0.025 cm) and about 0.125 inch (0.318 cm) thick on the inner cylindrical surface 24', and more preferably between about 0.010 inch (0.025 cm) and about 0.040 inch (0.102 cm) thick. It is also preferred to leave uncoated the end portions 21' of the driveshaft tube, as illustrated in FIG. 3. Preferably between about 2 inches (5.08 cm) and about 6 inches (15.24 cm) from each end 20' of the driveshaft tube are left uncoated. Leaving the end portions 21' uncoated keeps the coating material 26 a sufficient distance away from the weld zone where the tube yoke 22 is welded to the driveshaft tube 16' (see FIG. 1). This avoids the possibility of burning and smoking of the coating material during welding of the tube yoke.

Different materials having different physical properties can be used as the sound deadening coating material. For instance, the coating material can be in the form of a liquid or a foam which is sprayed onto the inner cylindrical surface of the driveshaft tube and then allowed to harden.

The coating material provides a quantity of mass distributed throughout the driveshaft tube to reduce or dampen the sound and vibration of the tube when it rotates. Preferably the coating material has a relatively high density so that a thin layer of coating material can be applied inside the driveshaft tube while still providing sufficient mass to dampen the sound and vibration. The coating material preferably has a density of at least about 0.8 g/cc.

It has been found that best results are obtained when a continuous coating of the coating material is applied on the inner cylindrical surface of the driveshaft tube, and when the coating material makes intimate contact with the inner cylindrical surface. Thus, the preferred method of applying the coating material is as a liquid. A liquid will achieve more intimate contact with the surface, as contrasted with a foam which includes air bubbles and therefore less contact with the surface. As a percentage of the coated surface area of the inner cylindrical surface, preferably the surface area contacted by the coating material is at least about 50%, and more preferably at least about 75%.

Different types of coating material are suitable for use in the invention. A preferred coating material is an elastomer such as a synthetic plastic. More preferably, the coating material is a tough elastic two component urethane elastomer system designed for spray coating applications, commercially available from BASF Corporation, Chemicals Division, Wyandotte, Mich. Such an elastomer system comprises, by weight, about 37.5% resin having a viscosity of 1530 cps at 25° C. and 520 cps at 60° C., and about 62.5% isocyanate having a viscosity of 3300 cps at 25° C. and 480 cps at 60° C. The elastomer system is formed by mixing together the resin and isocyanate so that they react chemically and form a urethane elastomer. The elastomer is applied as a liquid. Preferably a 0.100 inch (0.254 cm) thick coating of this material is sprayed at 65° C. on the inner cylindrical surface of the driveshaft tube. The elastomer coating has a density of about 0.9–1.05 g/cc and contacts at least 75% of the surface area. The coating effectively deadens sound and vibration.

Another suitable coating material is a liquid urethene foam, available commercially from National Starch & Chemical Co., Bridgewater, N.J., having a viscosity of 3000 cps at 72° F. (21° C.).

If desired, materials such as reinforcement materials, density enhancers, hardeners or fillers can be added to the coating material. If the coating material is applied very thin, it may be preferred to include a reinforcement material such as fiberglass or graphite. A density enhancer such as a powdered metal can provide the same density coating with a reduced quantity of coating material. A hardener can be added to cause the coating material to set up more quickly.

The coating material can be applied to the inner cylindrical surface of the driveshaft tube by different methods. As discussed above, preferably the coating material is applied as a liquid and then allowed to harden. In a preferred method, the coating material is applied by spray coating. Suitable spray coating equipment typically includes means for holding the supply of coating material, and means for dispensing the coating material under pressure. For example, when the coating material is a two component system, the equipment includes a separate drum for holding each of the components. Supply tubes from each of the drums combine into a single supply tube which feeds the combined coating material to the dispensing head of a spray gun. Pumps can impart hydraulic pressure to dispense the coating material at a pressure between 1000 and 3500 psi, typically between 2000 and 3000 psi.

Other spray coating equipment, used with single component coating materials, can include means for heating the coating material so that it is in a melted state when dispensed. For example, the equipment can include a heated static mixer to melt the coating material at a temperature between 150° F. (66° C.) and 300° F. (149° C.).

Suitable spray coating equipment is commercially available from a number of manufacturers such as, for example, Gusmer Co., Lakewood, N.J. and Nordson Corp., Westlake, Ohio.

Figure 4:
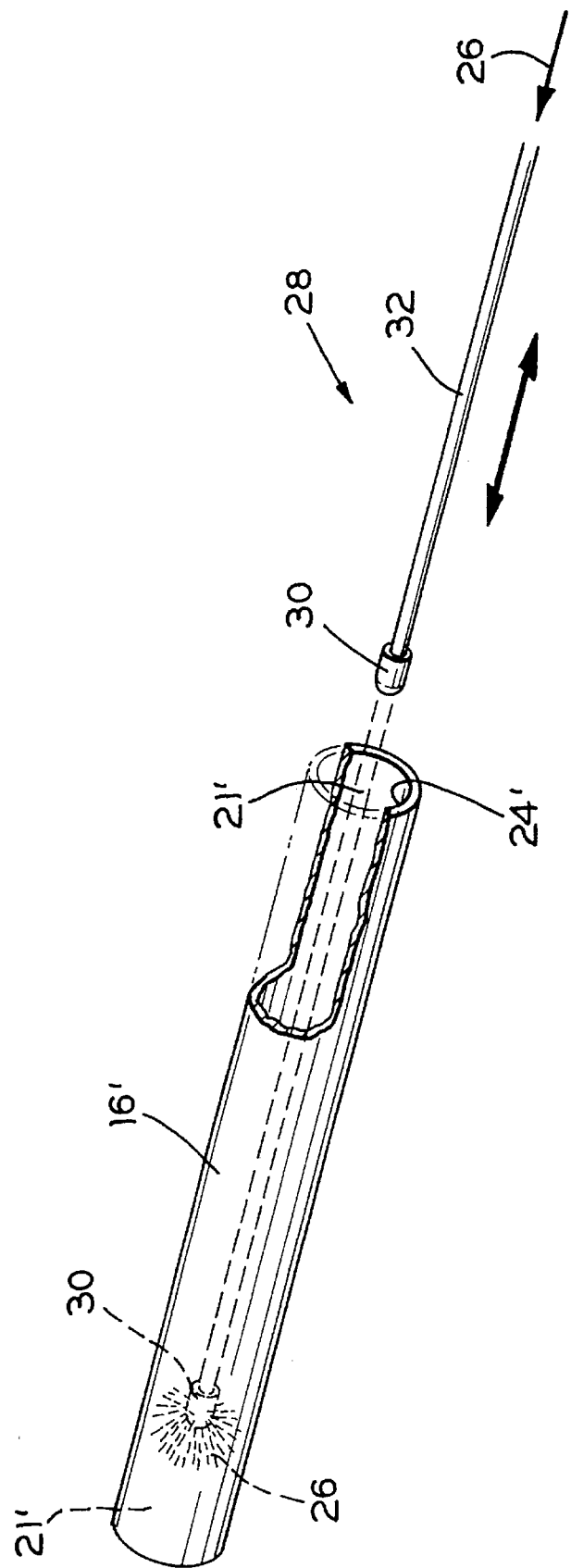
FIG. 4 is a schematic view in perspective of a method in accordance with this invention for coating a driveshaft tube with a sound deadening material.

Referring now to FIG. 4, there is illustrated a preferred coating application method for the driveshaft tube 16' of this invention. The drawing shows a spray gun indicated generally at 28. The spray gun 28 includes a dispensing head 30 attached to the end of a supply tube 32. The supply tube 32 is connected to separate supply tubes from two drums (not shown), each drum holding a component of a two component coating material. Coating material 26 is applied by inserting the dispensing head 30 inside the driveshaft tube 16', and then moving the dispensing head axially through the length of the driveshaft tube while spraying the coating material. The large two-sided arrow in the drawing illustrates the movement of the spray gun 28, and the small one-sided arrow illustrates the direction of the coating material 26 into the supply tube 32. In more detail, a preferred coating application method includes the following sequence of operations: (1) Insert dispensing head 30 to end of driveshaft tube 16'. (2) Begin to retract dispensing head 30. (3) Start spraying of coating material 26. (4) Apply coating material 26 for desired length of driveshaft tube 16'. (5) Stop supply of coating material 26. (6) Continue to retract dispensing head 30 from the driveshaft tube 16'. This coating application method results in the inner cylindrical surface 24' of the driveshaft tube 16' being effectively coated with the sound deadening coating material 26. The end portions 21' of the driveshaft tube 16' are left uncoated by this method.

The method of coating the driveshaft tube can be modified to improve the efficiency of the method or enhance the finished product. For example, if a coating material is applied in liquid form, the driveshaft tube can be rotated during and after coating until the coating material hardens. This will prevent any dripping, sagging or running of the coating material and ensure that it is distributed uniformly on the inner cylindrical surface of the driveshaft tube. The time required for the coating material to harden can be reduced by blowing air through the driveshaft tube, or by heating the driveshaft tube with an oven or heat lamp. The method of manufacturing the coated driveshaft tube can be automated to increase the production rate.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft tube for a vehicle drive train comprising:

a single hollow cylindrical tube including a pair of ends, said tube defining an inner cylindrical surface;

an end fitting secured to each end of said tube and adapted to provide a rotational driving connection between a source of rotational power and a load; and a coating of a sound deadening material adhered to said inner cylindrical surface of said tube for absorbing acoustical noise within said tube to reduce the magnitude of such acoustical noise transmitted through said tube.

2. The driveshaft tube described in claim 1 wherein said coating material has a density of at least about 0.8 g/cc.

3. The driveshaft tube described in claim 1 wherein said coating material contacts at least about 50% of the surface area of said inner cylindrical surface, as a percentage of the coated surface area.

4. The driveshaft tube described in claim 1 wherein said coating is between about 0.010 inch (0.025 cm) and about 0.125 inch (0.318 cm) thick.

5. The driveshaft tube described in claim 4 wherein said coating is between about 0.010 inch (0.025 cm) and about 0.04 inch (0.102 cm) thick.

6. The driveshaft tube described in claim 1 wherein said coating is comprised of an elastomer.

7. The driveshaft tube described in claim 6 wherein said elastomer is a urethane elastomer.

8. The driveshaft tube described in claim 7 wherein said urethane elastomer is a two-component elastomer comprising a resin and isocyanate.

9. The driveshaft tube described in claim 1 wherein portions of said inner cylindrical surface at said ends of said driveshaft tube are not coated with said sound deadening material.

10. The driveshaft tube described in claim 9 wherein said portions of said inner cylindrical surface at said ends of said driveshaft tube are not coated where said yokes are secured thereto.

11. The driveshaft tube described in claim 9 wherein said portions of said inner cylindrical surface at said ends of said driveshaft tube are not coated for a distance between about 2 inches (5.08 cm) and about 6 inches (15.24 cm) from each of said ends of said driveshaft tube.

12. The driveshaft tube described in claim 1 wherein said tube is formed from a metal selected from the group consisting of steel and aluminum alloy.

* * * * *